(12) United States Patent
Pedroia

(10) Patent No.: US 12,653,200 B2
(45) Date of Patent: Jun. 16, 2026

(54) METHOD AND DEVICE FOR PRODUCING SAUSAGE CHAINS

(71) Applicant: PEME SA, Quartino (CH)

(72) Inventor: Stefano Pedroia, Quartino (CH)

(73) Assignee: PEME SA, Quartino (CH)

( * ) Notice: Subject to any disclaimer, the term of this patent is extended or adjusted under 35 U.S.C. 154(b) by 0 days.

(21) Appl. No.: 18/837,360

(22) PCT Filed: Feb. 7, 2023

(86) PCT No.: PCT/EP2023/052917
§ 371 (c)(1),
(2) Date: Aug. 9, 2024

(87) PCT Pub. No.: WO2023/152104
PCT Pub. Date: Aug. 17, 2023

(65) Prior Publication Data
US 2025/0143327 A1 May 8, 2025

(30) Foreign Application Priority Data
Feb. 9, 2022 (DE) ..................... 10 2022 103 017.2

(51) Int. Cl.
*A22C 11/12* (2006.01)
*A22C 11/02* (2006.01)
(52) U.S. Cl.
CPC ........ *A22C 11/0263* (2013.01); *A22C 11/122* (2013.01); *A22C 11/127* (2013.01)
(58) Field of Classification Search
CPC ...... A22C 11/12; A22C 11/122; A22C 11/127
USPC ..................................................... 452/48, 51
See application file for complete search history.

(56) References Cited

U.S. PATENT DOCUMENTS

| | | | | |
|---|---|---|---|---|
| 4,401,329 A | * | 8/1983 | Pedroia | A22C 11/122 |
| | | | | 452/48 |
| 5,221,228 A | * | 6/1993 | Pedroia | A22C 11/127 |
| | | | | 452/46 |
| 5,495,701 A | * | 3/1996 | Poteat | B65B 57/00 |
| | | | | 29/243.57 |
| 5,532,014 A | * | 7/1996 | Kobussen | A22C 11/10 |
| | | | | 426/140 |

(Continued)

FOREIGN PATENT DOCUMENTS

| | | |
|---|---|---|
| DE | 102017115090 A1 | 12/2018 |
| EP | 2322040 A2 | 5/2011 |

(Continued)

OTHER PUBLICATIONS

International Search Report and Written Opinion Dated May 15, 2023 for corresponding application PCT/EP2023/052917.

(Continued)

*Primary Examiner* — David J Parsley
(74) *Attorney, Agent, or Firm* — Bachman & LaPointe, P.C.

(57) ABSTRACT

A method for producing sausage chains including at least two sausages, by a filling machine for filling a sausage mass into a sausage casing, wherein the sausage chain is tied for producing two separate sausages, and between the sausages, two spaced tying points and a bubble defined therebetween, wherein the bubble is smaller than a sausage and signals to an operator where to separate segments of the sausage chain from each other.

4 Claims, 4 Drawing Sheets

(56)                    References Cited

U.S. PATENT DOCUMENTS

| | | | |
|---|---|---|---|
| 6,523,462 | B1 | 2/2003 | Johnson et al. |
| 10,785,987 | B2 * | 9/2020 | Melchert .............. A22C 11/122 |
| 10,973,234 | B2 * | 4/2021 | Domlatil ................ A22C 11/12 |
| 2007/0254571 | A1 * | 11/2007 | Gladh .................. A22C 11/104 |
| | | | 452/32 |
| 2008/0139095 | A1 | 6/2008 | Mysker et al. |

FOREIGN PATENT DOCUMENTS

| | | | |
|---|---|---|---|
| EP | 2689665 | B1 | 3/2015 |
| EP | 2322040 | B1 | 5/2015 |
| EP | 3241447 | A1 | 11/2017 |
| EP | 3318131 | B1 | 5/2019 |
| WO | 2018234520 | A1 | 12/2018 |
| WO | 2019185693 | A1 | 10/2019 |

OTHER PUBLICATIONS

Poly-Clip System. "Poly-clip System—FCHL—Automatic Clipping/
Hanging Machine—Clip-/ Aufhängeautomat" Aug. 1, 2019. Retrieved
from the Internet: https://www.youtube.com/watch?v=lynykRalN3k
[retrieved on May 2, 2023] XP093043443.

* cited by examiner

State of Art

State of Art

State of Art

State of Art

METHOD AND DEVICE FOR PRODUCING SAUSAGE CHAINS

BACKGROUND OF THE INVENTION

The invention relates to a method for producing sausage chains consisting of at least two sausages, by means of a filling machine that fills a sausage mass into a sausage casing, wherein the sausage chain is tied for producing two separate sausages between said sausages, and to a device for this purpose.

RELATED ART

For producing sausages, a sausage mass, which is also referred to as sausage meat, is produced by means of a mixing device ad filled into a sausage casing in a filling machine. Fine sausage meant is prepared for example using a macerator or cutter. Raw sausage is minced and then briefly mixed, for example in a mixer or cutter, such that a bond results between fat and lean meat.

In general, this production is performed not only for an individual sausage but, for the sake of efficiency, as sausage chains, as sausages that are strung together are called. In this case, sausages of a desired length are separated from one another, which is generally performed by twisting or by tying. In the case of twisting, two adjacent sausages are twisted multiple times about their separating point, such that the sausage meat is pushed back into the sausage casings in both directions and a separating point results between the two sausages, at which a passage of sausage mass from one sausage to another sausage is prevented.

Sausages produced in this way are often produced in long chains, wherein after a filling machine they are suspended on hooks and are transported to further processing, for example to be strung up on a smoking bar.

A system of this kind is disclosed for example in EP 2 322 040 B1, according to which the filled sausage casings, divided up by the rotation points, are laid in loops and passed on to hooks. In this case, a plurality of sausages are suspended on successive hooks, which are then taken over by smoking skewers or smoking bars and are further processed in a smoking chamber.

However, before they enter the smoking chamber, the individual sausage chains are separated from one another between the individual hooks to form chain portions of for example six or eight sausages, in order that they are easier to handle for the further processing. Even today, this separation is generally still performed by hand, wherein, however, the separation does not take place at the twisting points, since then sausage meat would escape immediately from both the separated sausages, and both sausages would be lost. Therefore, in general, a sausage between two twisting points is severed, which is also referred to as a "sacrificial sausage". Said sacrificial sausage is severed approximately in the middle, the sausage meat is pushed out, and the sausage casing is knotted to the preceding or following sausage. Other possibilities for closing sausage ends are to close or weld them by hand using clips. Usually, the sausage end is also still connected to other portions, in order that the portioned sausages suspended on the hooks do not untwist. The latter in particular is a significant problem, which leads to significant loss.

The problem is therefore that not only the twisting point before and after the severed sausage, but rather also further twisting points of preceding and following sausages untwist, with the result that the losses are significant. The disadvantages are above all:

Product loss and reduced product quality, since the so-called sacrificial sausage is intended to be pressed out and supplied to recycling. In the case of fine sausage meat it is in principle possible to conduct the pressed-out product through the filling machine again. This is not possible in the case of a high-quality raw sausage, since the product quality would suffer as a result. That is to say that for such product residues the only possibility is to throw them away or to process them into cheaper products.

Loss of sausage casing. In any case, one sausage length per sausage chain/smoking bar is lost, which entails additional costs.

Handling. The sausage end must be knotted, but at the same time it must be ensured that the following sausages do not untwist. The pressed-out product must be returned to the filling machine and there put into the funnel.

Neither EP 2 322 040 B1 nor for example EP 2 689 665 B1 or EP 3 318 131 B1 addresses this very serious problem, these documents all relating to the production of sausage chains comprising sausages separated by twisting points.

Machines for tying sausages on a sausage chain are also known. In this case, in the context of the present invention "tying" is to be understood as ay closure of the sausage casing at a tying point. Said closure is primarily performed using a string or a thread, which is then guided from tying point to tying point, also beyond the sausage length. However, tying is also understood to mean a closure using a clip, knotting or welding. Every form of closure is intended to be included by the present invention.

Such machines for tying sausages on a sausage chain are disclosed for example in WO 2019 185693 A1, WO 2018 234520 A1 or DE 10 2017 115 090 B4. However, said tying at tying points is used only for sausages of a relatively large diameter and a high quality, wherein after the tying machine in general the individual sausages are cut, possibly also as a sausage pair, from a sausage chain. The tying is not used on long sausages on a very long sausage chain, such as Vienna sausages, bockwurst sausages, or the like.

Against this background, furthermore the poly-clip system video should be cited: "Poly-clip System—FCHL—Automatic Clipping/Hanging Machine—Clip—ZAufhängeautomat", 1 Aug. 2019 (2019-08-01), XP093043443, retrieved from the Internet: URL: https://www.youtube.com/watch?v=lynykRa1_N3k [retrieved on 2023-05-02]. This shows the opening of a large meat-processing facility in Russia in 2018. In particular, it discloses the use and the operation of a device produced by Poly-Clip System GmbH (FCHLAutomatic Clipping/Hanging Machine).

Finally, U.S. Pat. No. 6,523,462 B1 should also be cited. This document discloses that a suspension line for suspending the sausage chains is arranged downstream of the tying.

SUMMARY OF THE INVENTION

The problem addressed by the present invention is that of providing a method which prevents the above-mentioned disadvantages of the previous methods when producing sausage chains.

The problem is solved in that a casing piece is filled, in a bubble, with a sausage remainder, between two tying points, wherein said bubble signals to the a separation point of the sausage chain to the staff.

This means that the sausages remain in a chain after the tying machines and are preferably suspended on hooks of the suspension line until a plurality of hooks is filled and the sausage chains, laid in loops, as then for example transferred to a smoking bar.

In this case, an essential part of the invention is that each individual separating point between two sausages is tied, such that untwisting cannot occur in any case, and sausage mass cannot be lost again. As mentioned above, the tying is preferably performed by means of a string or a thread, which is guided from separating point to separating point. However, the other above-mentioned options for closing the sausage casing at a separating or tying point are also included in the scope of the invention.

However, a further essential part of the invention is directed to the fact that the separating point, from which subsequently individual chains will be separated from one another, is provided with at least two tying points. These tying points are preferably spaced apart from one another in such a way that separation can be performed between both, without the tying point being damaged. For example, said separation can be performed by a person using scissors, such that at the same time a string, which may be present, is also severed. For example two mutually spaced clips also signal to the staff that separation can take place between the two clips.

In this case, it is provided to fill a casing piece between the two spaced tying points with a sausage remainder, such that a bubble is visible. This bubble shows the staff that separation is intended to take place at this point, wherein only a small sausage remainder remains, which can be readily pushed out.

The present invention also comprises a device for producing sausage chains consisting of at least two sausages, by means of a filling machine that fills a sausage mass into a sausage casing, wherein a tying device is arranged between the filling machine and the suspension line. Said tying device is controlled such that it always creates at least one tying point between two sausages. After a certain number of sausages, however, it creates at least two spaced tying points, between which the individual sausage chains are then intended to be separated from one another.

In order to better identify the separating point, it is provided that a further casing piece is filled with a sausage remainder, between two tying points. A bubble formed thereby signals to the staff that separation should take place at this point.

BRIEF DESCRIPTION OF THE DRAWINGS

Further advantages, features and details of the invention will emerge from the following description of preferred embodiments, and on the basis of the drawings, in which.

DETAILED DESCRIPTION

Figures 1, 2:
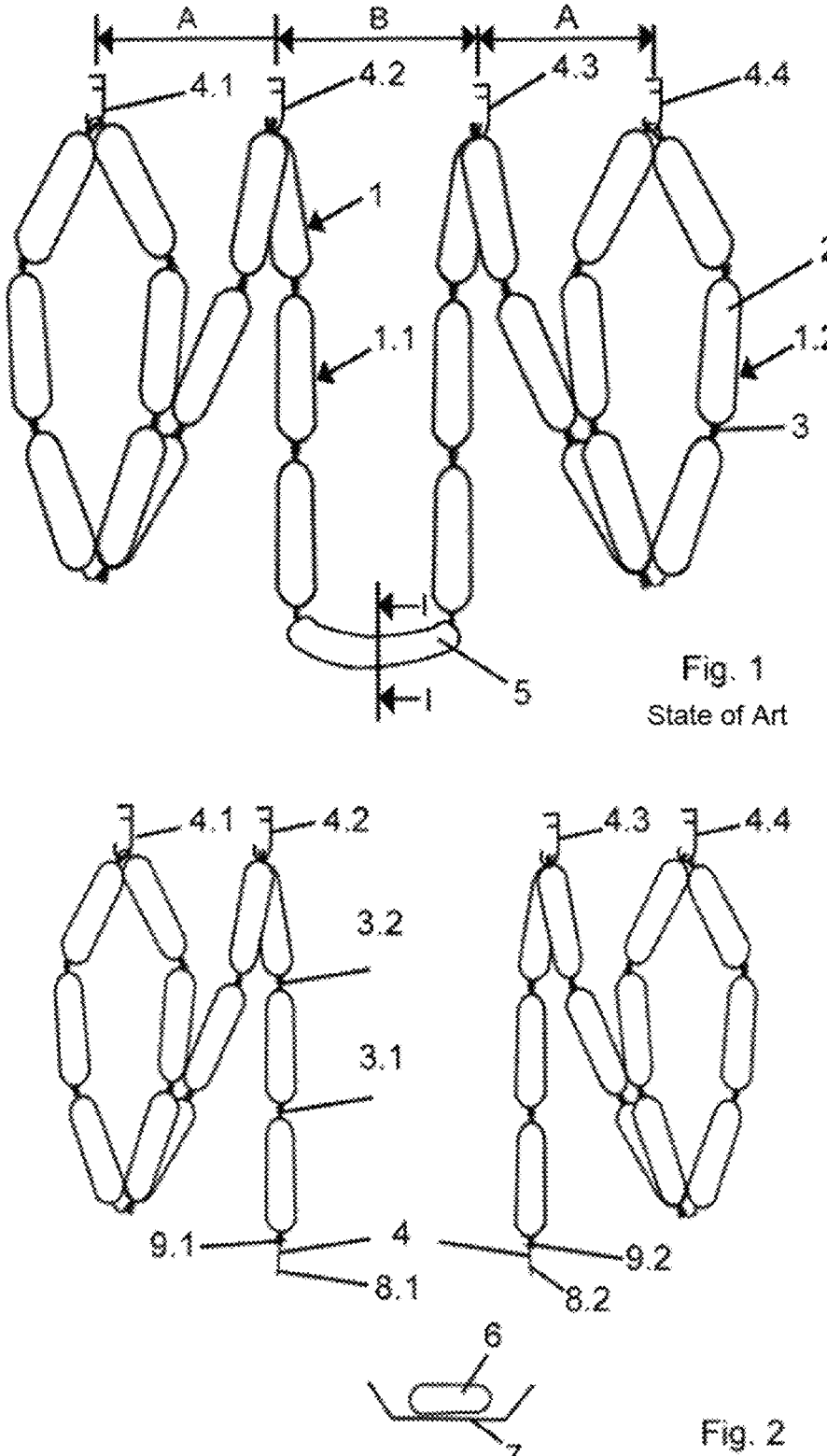
FIG. 1 is a schematic side view of a suspended sausage chain according to the prior art.
FIG. 2 is a schematic side view of a the sausage chain according to FIG. 1 after severing a "sacrificial sausage" according to the prior art.

FIG. 1 shows a detail of a sausage chain 1 which consists of a plurality of sausages 2 that are interconnected via twisting points 3. The sausage chains 1 are suspended in a suspension line on hooks 4.1 to 4.4. In this case, the hooks 4.1 and 4.2, and 4.3 and 4.4, have a spacing A which is smaller than a spacing B between the hooks 4.2 and 4.3. This visibly means, for the staff, that individual chain portions 1.1 and 1.2 are intended to be separated from one another at this point. What is known as a sacrificial sausage 5 is located at this spacing B between the two chain portions 1.1 and 1.2, which sausage is separated along a cutting line II for separating the chain portions 1.1 and 1.2.

Figure 3:
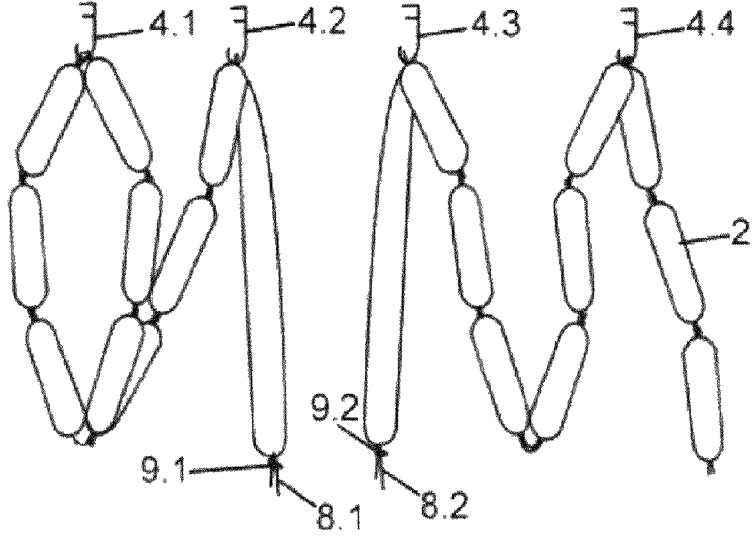
FIG. 3 is a side view of two sausage chains portions after an undesired untwisting, according to the method according to the prior art.

FIG. 2 schematically shows the situation after the separation of the sacrificial sausage, wherein sausage mass 6 from the sacrificial sausage is collected in a bowl 7. In order that the following or subsequent sausage does not empty, the two casing parts 8.1 and 8.2 of the sacrificial sausage must be provided with a knot 9.1 and 9.2, respectively. However, said knotting alone is not sufficient, since there is a significant risk of further twisting points 3.1 and 3.2, following the knots 9.1 and 9.2, respectively, untwisting and said sausages or the sausage mass thereof passing into one another, as is shown in FIG. 3. These sausages are also lost for further processing.

Figure 4:
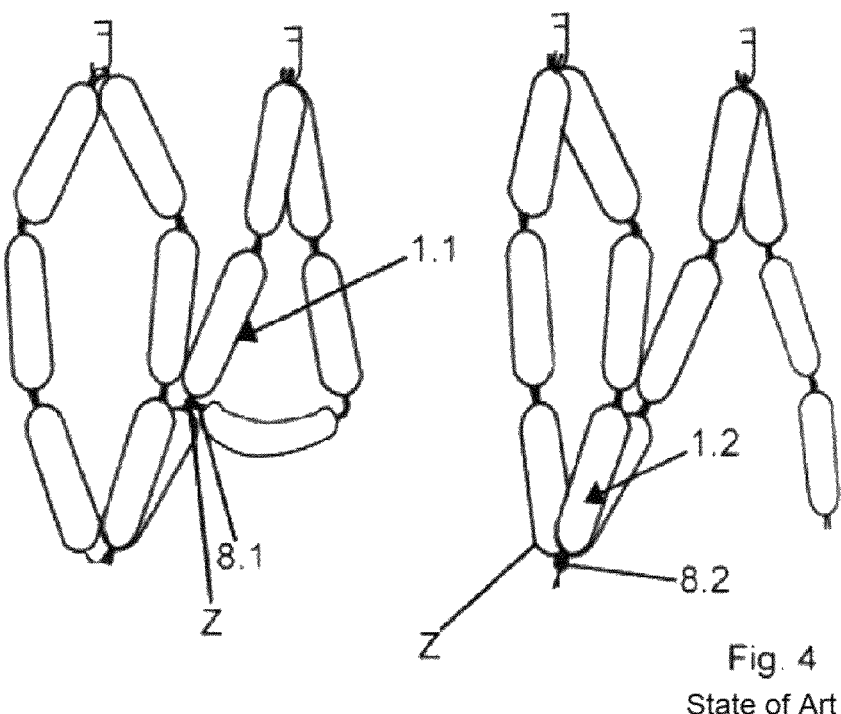
FIG. 4 is a side view of the separated sausage chains after rotation prevention according to the prior art.

The only possibility for preventing this untwisting is shown in FIG. 4, in which the casing parts 8.1 and 8.2 are knotted to parts of the chain portions 1.1 and 1.2, respectively.

Figure 5:
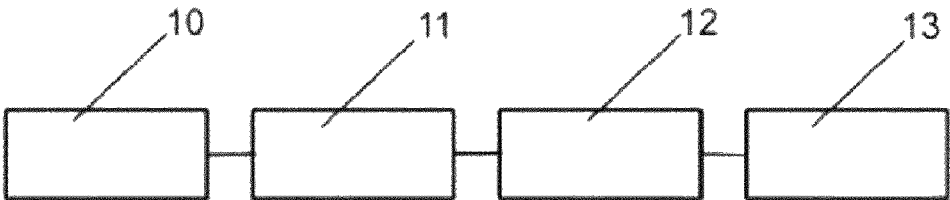
FIG. 5 is a diagrammatic illustration of a device according to the invention for producing sausage chains.

According to the present invention, according to FIG. 5 an entire device for producing sausage chains now consists of a filling machine 10 which is followed by a tying machine 11, and this by a suspension line 12. Said suspension line can follow any device for further processing, for example a transfer device for transferring the sausage chains to smoking bars.

That is to say that in the filling machine, on which for example a funnel for a sausage mass is positioned, sausage mass (sausage meat) is filled into a sausage casing, which is then transported further to the tying machine 11. In the tying machine 11, the individual sausages are tied from one another, such that a sausage chain results here. Said sausage chain then enters the suspension line 12, and is suspended there in loops on hooks for example. Separation of individual chain pieces 1.1 and 1.2 also takes place there. From the suspension line 12, the sausage chain reaches the hooks in the transfer device 13.

Figure 6:
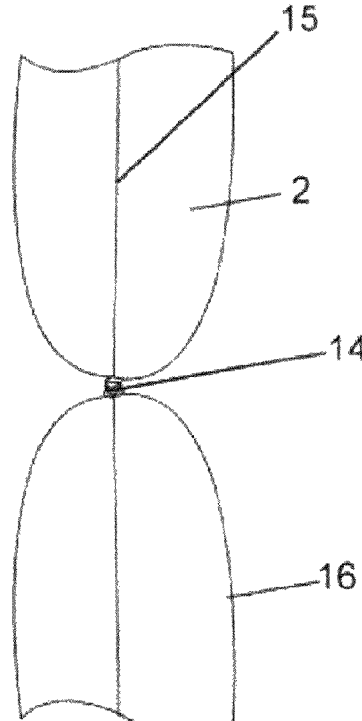
FIG. 6 is an enlarged plan view of two sausages which are separated at a tying point.

In the case of a plurality of sausages 2, a simple tying point 14 is created between two sausages according to FIG. 6, in that a string 15 is wound multiple times around a sausage casing 16 and this is tied up. In this way, the two sausages are separated from one another.

Figure 7:
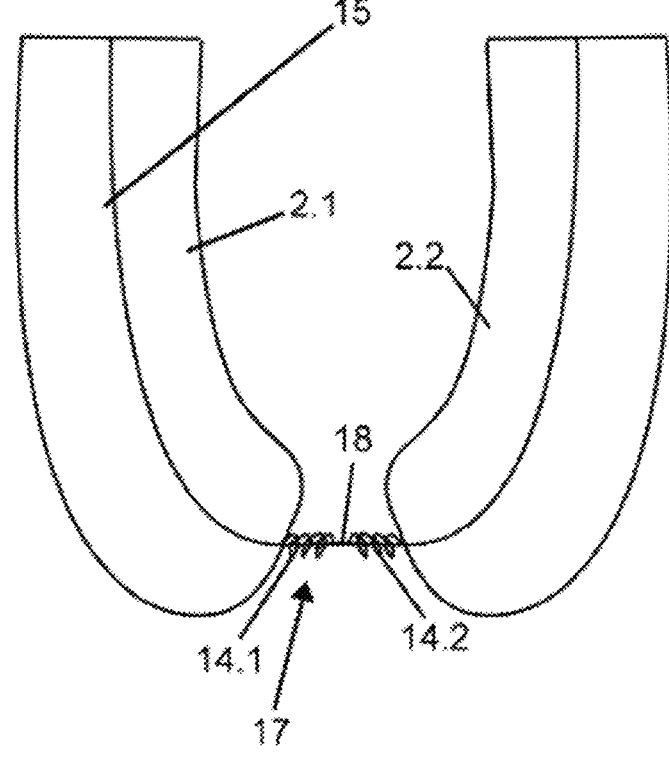
FIG. 7 is a plan view of two sausages comprising a separating point according to the invention consisting of two tying points.

FIG. 7 now shows the region of a separating point 17 at which chain portions 1.1 and 1.2 are intended to be separated from one another. Here, two tying points 14.1 and 14.2 are located between two sausages 2, which tying points leave free a casing piece 18 between them, in which there is no sausage mass or only a small amount of sausage mass. The separation of the chain portions from one another then takes place in said region. However, the two tying points 14.1 and 14.2 ensure that no sausage mass escapes from the sausages 2, and that the following sausages do not untwist either.

Figure 8:
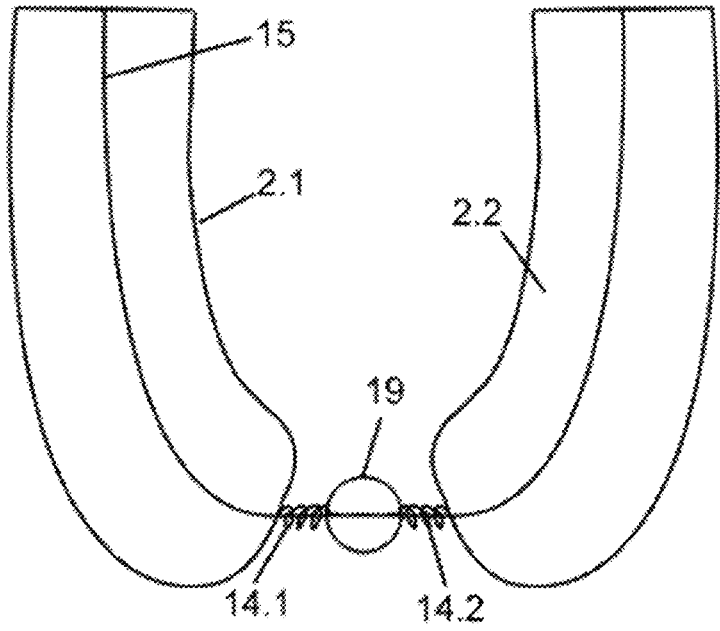
FIG. 8 is a plan view of two sausages in accordance with FIG. 7, in an improved embodiment.

FIG. 8 shows that there is a sausage remainder in the casing piece 18, between the two tying points 14.1 and 14.2, such that said casing piece has swollen up to form a bubble 19. Said bubble 19 signals to the staff that separation should take place at this point. However, only a very small product loss is associated with said sausage remainder in the bubble 19, wherein this remainder is also generally not recycled.

Overall, this new method and the new device has the significant advantage that there can be no untwisting of the sausage chain portions after the separating point, and thus the product loss is significantly minimised. Furthermore, no sausage meat has to be disposed of or assessed as to whether it is suitable for being used for refilling. The length of the sausage chain or the length of the sausage chain portions is not reduced. The staff are not required to carry out handling that is too complicated, such as knotting with other parts of the sausage chain portions, and can identify the point at which the sausage chain is intended to be separated.

| List of reference signs | |
|---|---|
| 1 | Sausage chain |
| 2 | Sausage |
| 3 | Twisting point |
| 4 | Hook |
| 5 | Sacrificial sausage |
| 6 | Sausage mass |
| 7 | Bowl |
| 8 | Casing part |
| 9 | Knots |
| 10 | Filling machine |
| 11 | Tying machine |
| 12 | Suspension line |
| 13 | Transfer device |
| 14 | Tying point |
| 15 | String |
| 16 | Sausage casing |
| 17 | Separating point |
| 18 | Casing piece |
| 19 | Bubble |
| 20 | |
| 21 | |
| 22 | |
| 23 | |
| 24 | |
| 25 | |
| 26 | |
| 27 | |
| 28 | |
| 29 | |
| 30 | |
| 31 | |
| 32 | |
| 33 | |
| 34 | |
| 35 | |
| 36 | |
| 37 | |
| 38 | |

-continued

| List of reference signs | |
|---|---|
| 39 | |
| 40 | |
| 41 | |
| 42 | |
| 43 | |
| 44 | |
| 45 | |
| 46 | |
| 47 | |
| 48 | |
| 49 | |
| 50 | |
| 51 | |
| 52 | |
| 53 | |
| 54 | |
| 55 | |
| 56 | |
| 57 | |
| 58 | |
| 59 | |
| 60 | |
| 61 | |
| 62 | |
| 63 | |
| 64 | |
| 65 | |
| 66 | |
| A | Spacing |
| B | Spacing |

The invention claimed is:

1. Method for producing sausage chains (1) consisting of at least two sausages (2), comprising:
   filling a sausage mass (6) into a sausage casing (16) to produce a sausage chain (1),
   tying the sausage chain (1) to produce two separate sausages (2.1, 2.2) at two spaced tying points (14.1, 14.2) between said two separate sausages (2.1, 2.2), and
   suspending the sausage chains (1) downstream of the tying,
wherein the tying step defines a bubble (19) between the two spaced tying points (14.1, 14.2), wherein said bubble (19) signals a separating point of the sausage chain (1).

2. The method of claim 1, wherein the bubble (19) is smaller than the two separate sausages.

3. The method of claim 1, wherein the suspending step suspends the sausage chain between two adjacent suspension points (4.2, 4.3) with the sausages hanging downwardly from the suspension points and the bubble (19) horizontally connects segments of the sausage chain.

4. The method of claim 1, further comprising the step of separating sausage chain segments from each other by cutting the bubble (19).

* * * * *